(12) United States Patent
Zietlow et al.

(10) Patent No.: US 6,387,432 B1
(45) Date of Patent: May 14, 2002

(54) DRIED MARSHMALLOW METHODS OF PREPARATION FOR INCREASING BOWL LIFE

(75) Inventors: Philip K. Zietlow, Wayzata; Gerald L. Wilson, New Hope; Michael A. Helser, Minneapolis, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/107,169

(22) Filed: Jun. 12, 1998

(51) Int. Cl.$^7$ ................................................. H23G 3/00
(52) U.S. Cl. ........................ 426/571; 426/660; 426/445; 426/470
(58) Field of Search ................................ 426/660, 571, 426/470, 445

(56) References Cited

U.S. PATENT DOCUMENTS

| | | | | |
|---|---|---|---|---|
| 1,566,329 A | * | 12/1925 | Laskey | 426/103 |
| 2,097,143 A | * | 10/1937 | Campbell | 426/571 |
| 2,142,688 A | * | 1/1939 | Anderson | 426/571 |
| 2,187,122 A | * | 1/1940 | Guth | 426/571 |
| 2,238,164 A | * | 4/1941 | Edwards | 426/571 |
| 2,520,581 A | * | 8/1950 | Turner et al. | 426/571 |
| 2,722,177 A | * | 11/1955 | Routh | 426/249 |
| 2,847,311 A | * | 5/1958 | Doumak et al. | 426/571 |
| 2,874,649 A | * | 2/1959 | Pelletier | 426/249 |
| 2,981,629 A | * | 4/1961 | Ginnette et al. | 426/470 |
| 3,014,437 A | * | 12/1961 | Dutchess | 426/249 |
| 3,018,183 A | * | 1/1962 | Downey | 426/571 |
| 3,062,661 A | * | 11/1962 | Doumak et al. | 426/521 |
| 3,206,315 A | * | 9/1965 | Anderson et al. | 426/571 |
| 3,220,853 A | * | 11/1965 | Golosinec | 426/571 |
| 3,345,186 A | * | 10/1967 | Kania et al. | 426/470 |
| 3,365,331 A | * | 1/1968 | Miller et al. | 127/30 |
| 3,461,822 A | * | 8/1969 | Rikert et al. | 426/571 |
| 3,551,165 A | * | 12/1970 | Reesman et al. | 426/571 |
| 3,556,812 A | | 1/1971 | Krohn et al. | 99/134 |
| 3,607,309 A | | 9/1971 | Olney et al. | 99/134 |
| 3,615,592 A | * | 10/1971 | Peterson | 426/571 |
| 3,620,769 A | * | 11/1971 | Peterson | 426/571 |
| 3,649,302 A | * | 3/1972 | Daggy et al. | 99/139 |
| 3,684,528 A | * | 8/1972 | Batey | 426/571 |
| 3,826,854 A | * | 7/1974 | Sanna et al. | 426/571 |
| 3,873,754 A | * | 3/1975 | Gorny | 426/426 |
| 3,981,739 A | * | 9/1976 | Dmitrovsky et al. | 127/60 |
| 4,120,987 A | * | 10/1978 | Moore | 426/572 |
| 4,229,484 A | * | 10/1980 | Steels et al. | 426/279 |
| 4,251,201 A | * | 2/1981 | Krysiak | 425/132 |
| 4,251,561 A | | 2/1981 | Gajewski | 426/571 |
| 4,272,558 A | * | 6/1981 | Bouette | 426/660 |
| 4,323,588 A | * | 4/1982 | Vink et al. | 426/564 |
| 4,338,350 A | * | 7/1982 | Chen et al. | 426/658 |
| 4,362,757 A | * | 12/1982 | Chen et al. | 426/599 |
| 4,410,555 A | | 10/1983 | Richardson | 426/572 |
| 4,415,595 A | | 11/1983 | Takemori et al. | 426/101 |
| 4,450,179 A | * | 5/1984 | Vink et al. | 426/103 |
| 4,597,980 A | * | 7/1986 | Böcher et al. | 426/568 |
| 4,640,717 A | * | 2/1987 | Shukla et al. | 127/58 |
| 4,714,620 A | * | 12/1987 | Bunick et al. | 426/572 |
| 4,774,100 A | | 9/1988 | Markwardt et al. | 426/572 |
| 4,785,551 A | | 11/1988 | Meyer | 34/10 |
| 4,853,235 A | * | 8/1989 | Tomomatsu | 426/93 |
| 4,911,937 A | * | 3/1990 | Crosello et al. | 426/103 |
| 4,913,924 A | | 4/1990 | Moore | 426/578 |
| 4,925,380 A | | 5/1990 | Meisner | 428/131.1 |
| 4,970,084 A | * | 11/1990 | Pirrotta et al. | 426/289 |
| 5,019,404 A | | 5/1991 | Meisner | 426/249 |
| 5,030,460 A | * | 7/1991 | Baggerly | 426/103 |
| 5,030,469 A | * | 7/1991 | Mergelsberg | 424/564 |
| H1322 H | * | 6/1994 | Moore et al. | 426/572 |
| 5,342,635 A | * | 8/1994 | Schwab et al. | 426/241 |
| 5,388,772 A | * | 2/1995 | Tsau | 241/17 |
| 5,429,830 A | * | 7/1995 | Janovsky et al. | 426/94 |
| 5,451,419 A | * | 9/1995 | Schwab et al. | 426/564 |
| H1527 H | * | 4/1996 | Moore | 426/571 |
| 5,532,017 A | | 7/1996 | O'Donnell et al. | 426/571 |
| D376,039 S | * | 12/1996 | Pike | D1/120 |
| 5,580,601 A | * | 12/1996 | Ribadeau-Dumas et al. | 426/660 |
| 5,582,351 A | * | 12/1996 | Tsau | 241/17 |
| 5,695,805 A | * | 12/1997 | Borek et al. | 426/620 |
| 5,789,002 A | | 8/1998 | Duggan et al. | 426/3 |
| 5,874,120 A | * | 2/1999 | Borcek et al. | 426/500 |
| 5,925,387 A | * | 7/1999 | Gimmler et al. | 426/5 |

OTHER PUBLICATIONS

The Mondomix Process for the Manufacture of Aerated Sugar Confectionery, Van Der Schaaf, Dec. 17, 1974.
Commercial Brochure Bepex Corporation, 1992, No Month Available.
Alikonis, "Candy Technology", pp. 49–61, 69, 1979, No Month Available.*
Minifie, "Chocolate, Cocoa, and Confectionery", $2^{nd}$ ed., pp. 424–431, 704–714, 1980, No Month Available.*
Mercior, "Extrusion Cooking", pp. 147–153, 1989, No Month Available.*
Minifie, "Chocolate, Cocoa, and Confectionery", $3^{rd}$ ed., pp. 508–512, 539–541, 547–549, 567–574, 1989, No Month Available.*

* cited by examiner

*Primary Examiner*—Nina Bhat
(74) *Attorney, Agent, or Firm*—John A. O'Toole; Douglas J. Taylor; Everett G. Diederiks, Jr.

(57) ABSTRACT

The present invention describes methods of cooling dried aerated confectionery pieces to increase bowl life, comprising the steps of: A. cooling a hot dried aerated confectionery piece in a soft plastic state having (1) a moisture content of less than 3.5% by weight, (2) an initial temperature of at least 80° C., and (3) a glass transition temperature ("Tg") of at least 15° C., to a temperature within a tempering temperature range, said tempering temperature range being Tg+5° C. to about Tg+30° C. to form a partially cooled, dried aerated confectionery piece; B. maintaining the cooled dried marshmallow piece within the tempering temperature range for about 1 to 15 minutes to form a tempered partially cooled, dried marshmallow piece; and C. further cooling the tempered partially cooled, dried marshmallow piece to below its Tg to form a cooled, dried marshmallow piece in solid form that exhibits an increased bowl life.

21 Claims, No Drawings

DRIED MARSHMALLOW METHODS OF PREPARATION FOR INCREASING BOWL LIFE

FIELD OF THE INVENTION

The present invention relates to food products and to methods for their preparation. More particularly, the present invention is directed towards dried aerated marshmallow confections and to their methods of preparation.

BACKGROUND OF THE INVENTION

Dried marshmallow, especially in the form of bits are well known aerated confection items and are particularly useful as a component of Ready-To-Eat ("RTE") cereals, especially those for children. Marshmallows are made by aerating a sugar syrup, usually including sucrose and corn syrup, that contains a foam structuring agent such as gelatin.

U.S. Pat. No. 4,925,380 (issued Oct. 20, 1986 entitled "Multicolor Confection Extrusion System") discloses apparatus and methods useful in the preparation of soft marshmallow confectionery pieces (see, equivalently U.S. Pat. No. 5,019,404 issued Feb. 28, 1990). Also known are methods for drying the marshmallow confection into dried pieces. (See, for example, U.S. Pat. No. 4,785,551 issued Nov. 22, 1988 to Meyer entitled "Method For Drying Confection Pieces.") Various dried particular shapes are also known (see, for example, D. 376,039 issued Dec. 3, 1996 entitled "Food Product" showing a two-color design). (Each of these are incorporated herein by reference.)

An important feature of an RTE cereal or component thereof, such as marshmallow bits, is having a long "bowl life," i.e., how long the item remains crisp after the addition of milk, especially cold milk. Another important feature of dried marshmallow bits is texture. While a firm, crisp, frangible texture is desirable, an excessively hard texture is undesirable especially in components used as additives to children's RTE cereals.

The bowl life of dried marshmallow bits can be influenced by formulation. Dried marshmallows that contain more corn syrup and less sucrose desirably tend to have longer bowl lives. Also, corn syrup is generally less expensive than sucrose. Unfortunately, longer bowl life and cost reduction benefits achieved by the addition of corn syrup are at the cost of texture. Increasing corn syrup levels tend to make the dried pieces harder. Adjustments to the formulation to provide acceptably low hardness values unfortunately provide dried marshmallows exhibiting unacceptably short bowl life.

The present invention provides an improvement in the preparation of dried marshmallow bits. The improvement resides in controlling the rate of cooling of dried marshmallow bits. The present methods provide dried marshmallow bits that exhibit improvements in their bowl life. Notwithstanding the improved bowl life, the marshmallow bits also surprisingly exhibit acceptable texture. By virtue of providing herein a physical processing method that benefits bowl life, additional flexibility can be employed with the formulation. Thus, a low cost, good texture dried marshmallow aerated confection, especially in bit form, can be obtained which nonetheless exhibits improved bowl life.

SUMMARY OF THE INVENTION

In its method of preparation aspect, the present invention resides in methods of cooling dried aerated confectionery pieces to increase bowl life, comprising the steps of:

A. cooling a hot dried aerated confectionery piece in a soft plastic state having (1) a moisture content of less than 3.5% by weight, (2) an initial temperature of at least 80° C., and (3) a glass transition temperature ("Tg") of at least 20° C., to a temperature within a tempering temperature range, said tempering temperature range being Tg+5° C. to about Tg+30° C. to form a partially cooled, dried aerated confectionery piece;

B. maintaining the cooled dried marshmallow piece within the tempering temperature range for about 1 to 15 minutes to form a tempered partially cooled, dried marshmallow piece; and C. further cooling the tempered partially cooled, dried marshmallow piece to below its Tg to form a cooled, dried marshmallow piece in solid form that exhibits an increased bowl life.

In its product aspect, the present invention resides in products prepared by the present cooling methods. The articles are further characterized by a density ranging from about 0.10 to 0.4 g/cc and comprising:
about 50% to 95% of a saccharide component,
about 1 to 5% moisture, and
about 1 to 30% of a foam structuring agent.

The confections can have a single color or have a plurality or even multiplicity of colors.

DETAILED DESCRIPTION OF THE INVENTION

In its method aspect, the present invention relates to methods for treating dried aerated confections to improve their properties, particularly bowl life. Each of the treatment method steps are described in detail as follows.

The starting material for use herein is a dried aerated confection in piece form such as a dried marshmallow. By "aerated confection product" is meant an aerated solid confectionery food product having a density in the range of from about 0.10 to about 0.4 g/cc (from about 35 to about 50 ounces per gallon in the confectioner's terminology). The present aerated confectionery essentially comprises from about 50 to about 95%, preferably about 85 to 95% of a saccharide component, and from about 1 to about 5% moisture, based on the total weight of the aerated confection product.

The saccharide component may include one or more pure monosaccharide and disaccharide sugars such as sucrose, dextrose (e.g., anhydrous, monohydrate or dextrose syrup) and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as honey, fruit juices, purees, nectars, fruit flavors and mixtures thereof.

The confection essentially further includes about 1 to 30, preferably about 1 to 4%, and most preferably about 2.5 weight percent of a foam structuring or gelling component such as a hydrocolloid ingredient such as pectin, gelatin, albumen and gums and mixtures thereof. For products to be marketed in North America, the preferred structuring agent is gelatin.

In certain variations, the confection can optionally further comprise about 1 to 20% starch. Starch is often topically applied to marshmallows, especially to control stickiness during manufacture. Frequently, not all of the topically applied starch is removed.

In one preferred embodiment, the marshmallows are fat free, i.e., have a fat content of less than 0.5% (dry weight basis). In other variations, e.g., chocolates, the aerated confection can comprise a fat constituent such as about 1 to 10% cocoa butter, dairy fat or other edible fatty triglyceride or fat mimics such as sucrose polyesters.

In certain variations, the aerated confections can comprise dried fruit puree solids. The dried fruit puree solids contribute not only to the saccharide portion but the pectin content can provide a portion of the foam structuring agent.

During their fabrication, the aerated confections can have a higher moisture content. However, the aerated confections are dried to a moisture content of 1 to 5%, preferably about 2 to 3.5%, prior to the present cooling and tempering methods. Preferred dried aerated confections are marshmallows. In one variation, the aerated confections such as dried marshmallows are in small pieces or marbits having a size count of 3 to 6/g. Marbits generally have a bulk density of about 235 to 340 g per liter.

The aerated confections are further essentially characterized by glass transition temperature ("Tg"). At a temperature above Tg, the aerated confections are relatively soft and pliable. Below their Tg, such dried aerated confection products typically have a firm or hard texture, rather than a soft or compliant texture. Particular Tg values vary with particular formulations. Generally, however, at higher moisture contents within 1 to 5% range, the Tg will be higher. Also, as the percentage of corn syrup decreases, the Tg decreases. In preferred embodiments, aerated confections are employed having a Tg ranging from about 70 to 120° F. (15 to 49° C.). The Tg can be discerned by feel. More precise determination of the Tg can be obtained by known means such as Differential Scanning Calorimitry ("DSC"). Preferably, the confections have a Tg of at least 25° C. at a moisture content of 3.5%. More preferably, the Tg ranges from about 25 to 45° C. and for best results about 35 to 45° C.

The confections can have a single color or have a plurality or even multiplicity of colors.

In the preferred embodiment, the starting material is still hot after having been dried to a moisture content of 1 to 5%, preferably about 2 to 3.5%, and more preferably about 2 to 3%. In less preferred embodiments, the dried confections have previously been allowed to cool such as to room temperature in an uncontrolled manner or otherwise not in accordance with the present methods but are reheated to a temperature within the starting temperature range.

The hot, dried confections are characterized by having a starting temperature within the range of 180 to 240° F. (82.2 to 115.5° C.), preferably 200 to 230° F. (93.3 to 110° C.).

Thereafter, the present methods essentially comprise the step of cooling the hot, dried aerated confections to a temperature within a tempering temperature range to form a partially cooled aerated confectionery piece. Thereafter, preferably immediately thereafter, the cooled aerated confectionery pieces are held or tempered at a temperature within the tempering temperature range for a time ranging from about 1 to 15 minutes, preferably about 1 to 10 minutes. The tempering temperature ranges from about Tg to about (Tg+40° C.). In preferred practice, the temperature can range can be from (Tg+5° C.) to about (Tg+30° C.). Best results are obtained when the tempering temperature ranges from about 38 to 72° C. (160° F.), preferably about 38 to 60° C. (100 to 140° F.).

While not wishing to be bound by the proposed theory, it is speculated herein that initially a very high percentage of the air cells in the aerated confection foam are of an open cell type. At drying temperatures (e.g., 180 to 240° F.), and well above their Tg, the aerated foam pieces are in a plastic state. However, as the aerated confection is maintained within the tempering range, a fraction of the air cells tend to shrink or transform from an open cell configuration to a closed cell configuration. Upon further subsequent cooling to room temperature and thus below the initial Tg the closed cell configuration is maintained as the confection cools to a solid form. Having a larger fraction of air cells in a closed cell configuration may be responsible for retarding moisture migration and thus responsible for improvements in bowl life. If the tempering step is not practiced and the confection cooled too rapidly to below their Tg, a greater proportion of the cells remain in an open cell configuration. Once cooled to below the Tg and the composition solidifies, the open cell configuration is retained.

In the practice of the prior art, the dried marshmallow or other dried confections are allowed to cool from drying temperatures to room temperatures in an uncontrolled manner by removing the pieces from the dryer and conveying the pieces to storage bins. Of course, the pieces will cool through the present tempering range as they cool from their hot dryer temperature to room temperature. The present invention thus essentially adds a step of controlling or maintaining the confections at a temperature within the tempering range for an additional 1 to 15 minutes, preferably about 1 to 10 minutes and more preferably about 2 to 10 minutes. The step is practiced by introducing the partially cooled pieces to a zone or environment having a temperature within the tempering range that maintains the aerated confection pieces within the desired temperature range for the tempering step.

The tempering step can be conveniently practiced utilizing conventional drying apparatus and techniques. For example, in a batch process, a quantity of aerated confections can be charged to a holding room that is maintained at a temperature of, conveniently, 37.8 to 60° C. (100 to 140° F.). The confections are held in the temper room for a desired period within the 1 to 15 minute time period. Thereafter, the products are removed from the controlled temperature room or environment and allowed to cool to room temperature.

In a continuous process, a quantity of aerated confection can be charged to an endless belt which convey the aerated confection pieces to a heated zone or tunnel that is maintained at a temperature within the desired tempering range. The speed and length of the endless belt are controlled so as to provide a residence time within the tempering zone for a time within the 1 to 15 minute time range. In more preferred variations, the aerated confections form a bed on the belt having a bed depth ranging from about 0.5 to 25 cm, preferably about 5 to 15 cm.

The present methods further essentially comprise cooling the tempered dried aerated confectionery pieces to a temperature below their Tg, cooling the piece to below their glass transition temperature resulting in a change in texture from a soft and pliable texture to a solid form. Preferably, the cooling step is practiced to rapidly cool the tempered, partially cooled, dried marshmallow piece from the tempering temperature to below the Tg in less than five minutes. In a particular variation, this rapid cooling is practiced by blowing the pieces with cool air having a temperature of less than the Tg of about (Tg−60° C.) to about (Tg−3° C.).

In preferred variations, the aerated confection pieces are characterized by having a Tg above room temperature 20° C. (70° F.), preferably above 38° C. (100° F.). For such preferred confections, the final cooling step can conveniently involve allowing the tempered confectionery pieces to cool to room temperature to form the present improved aerated confectionery pieces.

The present improved aerated confectionery pieces can be characterized by a density of about 0.1 to 0.4 g/cc, preferably 0.15 to 0.3 g/cc. In preferred embodiments, the pieces have a size count ranging from about 0.2 to 6/g, preferably about 1 to 6/g, and most preferably about 4 to 6/g.

The resulting tempered dried aerated confectionery pieces can then be consumed as confections.

The dried aerated confectionery pieces, particularly dried marshmallow pieces, find particular suitability for use as an appealing added component of food products. For example, the pieces may be admixed with a Ready-To-Eat ("R-T-E") breakfast cereal, especially sugar coated R-T-E cereals, intended as children's breakfast cereals.

In a preferred embodiment, the finished RTE cereal can comprise about 60 to 99% of a conventional dried cereal (such as flakes, shreds, puffs formed from a cooked cereal grain or dough of oats, wheat, corn, barley, rice or mixtures) and about 1% to about 40% by weight of the present novel dried marshmallow pieces.

The improved tempered dried aerated confectionery pieces of the present invention exhibit improved bowl life compared to otherwise identically formulated confectionery that have not been tempered according to the process of the present invention such as simply being allowed to cool to ambient temperature. By "bowl life" is meant the time that the dried aerated confectionery piece remains crispy when submerged in milk, preferably cold milk.

What is claimed is:

1. A method of cooling a dried aerated confectionery piece to increase its bowl life, comprising the steps of:
    A. cooling a hot dried aerated confectionery piece in a soft plastic state having (1) a moisture content of less than 5.0% by weight, (2) an initial temperature of at least 80° C. (176° F.), and (3) a glass transition temperature ("Tg") of at least 15° C., to a second temperature within a tempering temperature range, said tempering temperature range being Tg to about Tg+40° C. to form a partially cooled, dried aerated confectionery piece;
    B. maintaining the cooled dried aerated confectionery piece within the tempering temperature range for about 1 to 15 minutes to form a tempered partially cooled, dried aerated confectionery piece; and
    C. further cooling the tempered partially cooled, dried aerated confectionery piece to below its Tg by blowing the piece with cool air having a temperature of less than Tg to form a cooled, dried aerated confectionery piece in solid form that exhibits an increased bowl life.

2. The method of claim 1 wherein the tempering temperature ranges from about 38° C. (100° F.) to 72° C. (160° F.).

3. The method of claim 2 wherein the holding time ranges from about 1 to 10 minutes.

4. The method of claim 3 wherein the dried aerated confectionery piece has a Tg of greater than 25° C.

5. The method of claim 4 wherein the dried aerated confectionery piece is a dried marshmallow.

6. The method of claim 5 wherein the dried marshmallow comprises
    about 35 to 95% sucrose (solids basis)
    and wherein the pieces comprise
    about 5 to 60% corn syrup (solids basis),
    about 0.5 to 20% (solids basis) of a structuring ingredient selected from the group consisting of gelatin, pectin, albumen, starch, soy protein, or milk protein, gums and mixtures thereof.

7. The method of claim 5 wherein the Tg ranges from about 25° to 45° C.

8. The method of claim 7 wherein the dried marshmallow piece comprises less than about 10% corn syrup.

9. The method of claim 8 wherein the Tg ranges from about 35° to 45° C.

10. The method of claim 9 wherein step C is practiced to rapidly cool the tempered, partially cooled, dried marshmallow piece from the tempering temperature to below the Tg in less than five minutes.

11. The method of claim 1 wherein the cool air in step C has a temperature of about Tg–60° C. to about Tg–5° C.

12. The method of claim 1 wherein step B is practiced by introducing the partially cooled dried aerated confectionery pieces into a zone having a temperature of about 38 to 60° C.

13. The method of claim 12 wherein partially cooled dried aerated confection pieces are in the form of a bed having a bed depth of 0.25 to 25 cm.

14. The method of claim 1 wherein the hot pieces have previously been cooled to below their Tg after having been dried to about 1 to 5% moisture.

15. The method of claim 1 wherein the tempering temperature ranges from about Tg+5° C. to Tg+30° C.

16. The method according to claim 1, wherein the cooled dried aerated confectionery piece is maintained at substantially the second temperature from 2–10 minutes.

17. A method of cooling a dried aerated confectionery piece to increase its bowl life, comprising the steps of:
    A. cooling a hot dried aerated confectionery piece in a soft plastic state having (1) a moisture content of less than 5.0% be weight, (2) an initial temperature of at least 80° C. (176° F.), and (3) a glass transition temperature ("Tg") of at least 15° C., to a temperature within a tempering temperature range, said tempering temperature range being Tg to about Tg+40° C. to form a partially cooled, dried aerated confectionery piece;
    B. maintaining the cooled dried aerated confectionery piece within the tempering temperature range for about 1 to 15 minutes to form a tempered partially cooled, dried aerated confectionery piece; and
    C. further cooling the tempered partially cooled, dried aerated confectionery piece to below its Tg, by blowing the piece with cool air having a temperature of less than Tg, to form a cooled, dried aerated confectionery piece in solid-form that exhibits an increased bowl life.

18. The method of claim 17 wherein the cool air in step C has a temperature of about Tg–60° C. to about Tg–5° C.

19. The method of claim 18 wherein the Tg ranges from about 35° to 45° C.

20. The method of claim 19 wherein the holding time ranges. from about 2 to 10 minutes.

21. The method of claim 20 wherein the tempering temperature ranges from about 38° C. (100° F.) to 72° C. (106° F.).

* * * * *